(12) United States Patent
Chancey et al.

(10) Patent No.: US 6,686,557 B1
(45) Date of Patent: Feb. 3, 2004

(54) NONFLAMMABLE TERNARY GAS MIX FOR HIGH PRESSURE PLASMAS

(75) Inventors: John Edward Chancey, Grosse Pointe Farms, MI (US); Lawrence Edward Ellis, Dearborn Heights, MI (US); Larry G Gargol, Ann Arbor, MI (US); Srikanth C. Reddy, Westland, MI (US)

(73) Assignee: Ford Motor Company, Dearborn, MI (US)

( * ) Notice: Subject to any disclaimer, the term of this patent is extended or adjusted under 35 U.S.C. 154(b) by 0 days.

(21) Appl. No.: 10/248,118

(22) Filed: Dec. 19, 2002

(51) Int. Cl.$^7$ ................................................ B23K 10/00
(52) U.S. Cl. ........................ 219/121.51; 219/121.59; 219/121.46; 219/75
(58) Field of Search ...................... 219/121.36, 121.39, 219/121.4, 121.51, 121.48, 121.55, 74, 75, 121.46; 313/231.31

(56) References Cited

U.S. PATENT DOCUMENTS

| | | | |
|---|---|---|---|
| 3,582,604 A | * | 6/1971 | Byhovsky et al. ..... 219/121.51 |
| 4,937,500 A | | 6/1990 | Christophorou et al. |
| 5,159,173 A | * | 10/1992 | Frind et al. ............. 219/121.47 |
| 5,414,236 A | * | 5/1995 | Couch, Jr. et al. ...... 219/121.39 |
| 6,126,858 A | | 10/2000 | Gourlaouen et al. |
| 6,165,687 A | | 12/2000 | Reele |
| 6,333,481 B2 | * | 12/2001 | Augeraud et al. ...... 219/121.51 |

* cited by examiner

*Primary Examiner*—Mark Paschall
(74) *Attorney, Agent, or Firm*—Brooks Kushman P.C.; Damian Porcari

(57) ABSTRACT

The present invention provides a nonflammable ternary gas mixture to be used in a plasma machining operation. The ternary gas mixture of the present invention comprises from about 4% to about 6.2% hydrogen, 30% to 50% argon, and the balance nitrogen. In another embodiment of the present invention, a method of generating a high pressure plasma is provided. The method of this embodiment comprises introducing the ternary gas mixture of the present invention into a plasma torch apparatus, initiating a plasma in the plasma torch apparatus, and sustaining the plasma with a high voltage between a cathode and an anode.

20 Claims, No Drawings

NONFLAMMABLE TERNARY GAS MIX FOR HIGH PRESSURE PLASMAS

BACKGROUND OF THE INVENTION

1. Field of the Invention

The present invention relates to gas mixtures used in high pressure plasma processes and, in particular, to high pressure plasma processes that use a nonflammable ternary gas mixture.

2. Background Art

High pressure plasmas are used for various plasma arc machining processes, such as metal cutting, metal gouging and metal coating deposition. Unlike low pressure systems, high pressure plasma systems can be operated both at atmospheric pressure and reduced pressures. A low pressure plasma can only be operated under reduced pressure environments. The part of the plasma apparatus used in these high pressure plasma processes from which the plasma issues is frequently referred to as a plasma torch or gun. The generation of a high pressure plasma requires the presence of a gas, typically introduced into the nozzle at high velocities. In a plasma, gas molecules are partially ionized into charged particles—ions and electrons. Accordingly, because of this ionic nature, plasmas conduct electricity. A hot zone is formed in the plasma when the ions and electrons recombine to give off intense heat and light. Plasma arcs operate typically at temperatures of 10,0000–14,0000° C.

Plasma arc cutting refers to thermal cutting processes that sever or remove metal by melting it with the heat of an arc between an electrode and the workpiece. Plasma gouging is a thermal cutting process variation that removes metal by melting or burning a portion of metal which is completely removed to form a bevel or groove. In both plasma arc cutting and gouging, electricity is conducted from the torch to a metallic workpiece. This is accomplished through an electrically conductive electrode within the plasma torch. Furthermore, in both these processes, the plasma used to melt the metallic workpiece is constricted and confined to a small area. Constriction is accomplished by a nozzle (often made from copper) which constricts the high velocity gas causing a tornado effect. This tornado effect provides energy to the arc that melts and blows away the metal.

A particularly useful high pressure plasma coating process is the Plasma Transferred Wire Arc ("PTWA") process. The PTWA system produces high quality metallic coatings for a variety of applications such as the coating of engine cylinder bores. In the PTWA process, a high pressure plasma is generated in a small region of space at the exit of the torch. A continuously fed wire impinges upon this region where the wire is contiguously melted by the plasma. The plasma torch takes the molten particles and directs them towards the surface to be coated. PTWA systems are high pressure plasma systems. High pressure plasmas are also utilized in metal cutting or gouging torches. The PTWA torch behaves much like a plasma cutting or plasma gouging torch, but produces a coating unlike the metal removal torches. Instead of allowing the molten droplets to be removed as is the case for metal removal torches, the droplets are directed onto a prepared surface in a defined pattern. The metal removal torches also operate at somewhat higher voltages than coating deposition torches.

Constant current direct current ("DC") electrical power supplies are used for the operation of most plasma torches. These power supplies maintain a user defined current level while the voltage is determined by the properties of the gas mix used and the geometry of the torch. The voltage multiplied by the current gives the total of amount of power that the torch is generating. The voltage of a plasma torch indicates the difficulty with which the molecules are ionized. Higher voltages indicate more difficulty in the ionization of the gas molecules. Therefore, a gas mixture which has a characteristically high voltage gives off greater amounts of heat energy during the process of recombination. By design, higher voltages are needed for the operation of the PTWA system than other coating deposition plasma torches. Few gas mixes can generate this kind of voltage without being flammable. Gas mixes containing oxygen can be used for this purpose. However, there are issues associated with using oxygen. The use of oxygen gas mixes require the use of a different cathode material such as zirconium or hafnium. Thoriated tungsten cathodes are preferred because of their extended lifetime. However, they are very sensitive to the presence of oxygen.

Typically, the PTWA method uses a gas mixture of 65–75% argon and 25–35% hydrogen. This gas mix provides sufficient energy needed to melt a continuously fed wire. The molten particles are subsequently used to form a metallic coating on a specified part. Unfortunately, this gas mixture is flammable, and requires the installation and use of fire protection and safety systems. The U.S. Department of Transportation sets a flammability threshold of 6.2% hydrogen by volume in an inert gas. Anything higher than this threshold is considered flammable.

U.S. Pat. Nos. 6,126,858 and 6,265,687 disclose ternary gas mixtures of helium, argon, and hydrogen useful for use in a low pressure plasma projection process. Both of these patents disclose ternary gas mixtures that include hydrogen in an amount of 5.5% to 15% by volume.

Concentration of hydrogen above 6.2% are classified as flammable by the U.S. Department of Transportation, while concentrations below this amount classified as nonflammable. Flammable hydrogen gas mixtures pose significant problems relating to storage and shipping of such mixture. U.S. Pat. No. 4,937,500 (the '500 patent) also discloses a ternary gas mix useful for closing switches in diffuse glow discharge. The '500 patent does not disclose a high pressure plasma process nor does it disclose ternary gas mixtures of hydrogen gas.

SUMMARY OF THE INVENTION

The present invention overcomes the problems encountered in the prior art by providing in one embodiment a nonflammable ternary gas mixture to be used in a plasma machining operation. The ternary gas mixture of the present invention comprises, more preferably consist essentially of, and most preferably consists of about 4% to about 6.2% hydrogen by volume, about 30% to about 50% argon by volume, and the balance nitrogen. The reduced amount of hydrogen classifies the ternary gas mixture of the present invention as nonflammable under DOT standards.

In another embodiment of the present invention, a method of generating a high pressure plasma is provided. The method of this embodiment comprises introducing the plasmagenic gas mixture of the present invention into a plasma torch apparatus, initiating a plasma in the plasma torch apparatus, and sustaining the plasma with a high voltage between a cathode and an anode.

DETAILED DESCRIPTION

Reference will now be made in detail to presently preferred compositions or embodiments and methods of the invention, which constitute the best modes of practicing the invention presently known to the inventors.

In an embodiment of the present invention, a plasmagenic gas mixture useful in a high pressure plasma is provided. The plasma gas mixture of the present invention is a ternary gas mixture. The term "ternary gas mixture" as used herein refers to a gaseous mixture having three components. The ternary gas mixture of the present invention comprises, more preferably consist essentially of, and most preferably consists of about 4% to about 6.2% hydrogen by volume, about 30% to about 50% argon by volume, and about 44% to about 66% nitrogen by volume (i.e., the balance is nitrogen). As used herein, all percentages are volume percentages of the total ternary gas mixture unless stated otherwise. In practice, these gas mixtures are made by filling a tank to a specified partial pressure with each gas. The hydrogen gas is preferably present in an amount of about 4% to about 6% of the total volume of the plasmagenic gas mixture. More preferably, the hydrogen gas is present in an amount of about 5% to about 6% of the total volume of the plasmagenic gas mixture, and most preferably about 6% of the total volume of the plasmagenic gas mixture. The plasmagenic gas preferably has from about 30% to about 40% argon gas of the total volume of the plasmagenic gas mixture, and more preferably about 35% argon of the total volume of the plasmagenic gas mixture. The reduced amount of hydrogen in the ternary gas mixture of the present invention classifies the ternary gas mixture of the present invention as nonflammable under DOT standards. Furthermore, the relatively small amount of hydrogen in the ternary gas mixture of the present invention advantageously preserves the cathode of a plasma torch from erosion which is caused by impurity amounts of oxygen and provides good thermal conductivity so that the wire can be efficiently heated.

In another embodiment of the present invention, a method of generating a high pressure plasma using the ternary gas mixture of the present invention as set forth above is provided. The method of this embodiment comprises:

a) introducing a plasmagenic gas enters into a plasma torch apparatus wherein the plasmagenic gas comprises:
   hydrogen gas in an amount of about 4% to about 6.2% of the total volume of the plasmagenic mixture;
   argon gas in an amount of about 30% to about 50% of the total volume of the plasmagenic mixture; and
   nitrogen gas in an amount of about 44% to about 66% of the total volume of the plasmagenic mixture;
b) initiating a plasma in the plasma torch apparatus; and
c) sustaining the plasma with a constant current power supply;

wherein the plasma torch apparatus comprises at least one electrode. The preferred ranges for each of the components of the ternary gas mixture are the same as set forth above. Preferably, the plasmagenic gas flows through a restricting orifice after the gas is introduced into the plasma torch apparatus. Typically the at least one electrode is a cathode and is connected the negative terminal of a high voltage power supply. The step of initiating the plasma is usually accomplished with a high voltage starting pulse or a high frequency starting pulse. A high voltage starting pulse (typically on the order of 15 KV) is created by activating a pilot plasma power supply (i.e., a starter power supply) that is pulsed "on" for sufficient time to strike a high voltage arc between the at least one electrode and a counter electrode (i.e., a cathode and anode.) In the Plasma Transferred Wire Arc process, the method of the present invention is used to coat a substrate with a metallic coating. Accordingly, the method of the invention in this variation further comprises introducing a wire feedstock into the plasma to form a spray of metal; and directing the spray of metal over a workpiece so that the workpiece is coated with a metallic film. Furthermore, in the PTWA process, an arc is struck between a cathode electrode and an anode. In this process, both the cathode and anode are typically positioned within the plasma gun. As used herein, the term "plasma gun" refers to that component of a plasma torch apparatus that includes at least one electrode and through which the plasmagenic gas mixture in flowed. After the plasma is ignited the arc which sustains the plasma is located between the cathode and the wire feed stock which is melted to coat a workpiece. The plasma is maintained by a constant current power supply operating at a sufficient voltage to sustain the plasma. Typically, this is a voltage of about 100 V or more. The cathode in the PTWA process is connected to the negative terminal of a constant current power supply, while the anode is connected to the positive terminal of such a power supply. The wire feed stock is in electrical contact with the anode and is effectively part of the anode. Finally, the polarity of this arrangement may be reversed without affecting the utility of the present invention.

In the plasma cutting and gouging processes, the metallic workpiece serves as the counter-electrode (typically the anode). In the case of plasma cutting, the method of the present invention further comprises directing the plasma onto a metallic workpiece; and moving the plasma over the metallic workpiece such that the metallic workpiece is a counter electrode and is cut by the plasma. Similarly, in the case of plasma gouging, the method of the present invention further comprises directing the plasma onto a metallic workpiece; and moving the plasma over the metallic workpiece such that the metallic workpiece is a counter electrode and metal is removed from the metallic workpiece by the plasma. In both plasma cutting and gouging, a plasma is thus ignited with an arc between the workpiece and the electrode in the plasma gun by the application of a pilot power supply. Again, the plasma is maintained by applying a constant current power supply between the workpiece and the electrode in the plasma gun. Typically, for all these plasma processes, the constant current power supply will operating at a voltage of 100 V or more.

While embodiments of invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A plasmagenic gas mixture comprising:
   hydrogen gas in an amount of about 4% to about 6.2% of the total volume of the plasmagenic mixture;
   argon gas in an amount of about 30% to about 50% of the total volume of the plasmagenic mixture; and
   nitrogen gas in an amount of about 44% to about 66% of the total volume of the plasmagenic mixture.

2. The plasmagenic gas mixture of claim 1 wherein the hydrogen gas is present in an amount of about 5% to about 6% of the total volume of the plasmagenic gas mixture.

3. The plasmagenic gas mixture of claim 1 wherein the hydrogen gas is present in an amount of about 6% of the total volume of the plasmagenic gas mixture.

4. The plasmagenic gas mixture of claim 1 wherein the argon gas is present in an amount of about 30% to about 40% of the total volume of the plasmagenic gas mixture.

5. The plasmagenic gas mixture of claim 1 wherein the argon gas is present in an amount of about 35% of the total volume of the plasmagenic gas mixture.

6. A method for forming a plasma for use in a plasma arc machining operation, the method comprising:
   a) introducing a plasmagenic gas enters into a plasma torch apparatus wherein the plasmagenic gas comprises:
      hydrogen gas in an amount of about 4% to about 6.2% of the total volume of the plasmagenic mixture;
      argon gas in an amount of about 30% to about 50% of the total volume of the plasmagenic mixture; and
      nitrogen gas in an amount of about 44% to about 66% of the total volume of the plasmagenic mixture;
   b) initiating a plasma in the plasma torch apparatus; and
   c) sustaining the plasma with a constant current power supply;
wherein the plasma torch apparatus comprises at least one electrode.

7. The method of claim 6 wherein the step of initiating a plasma comprises:
   activating a pilot plasma power supply having a negative and positive terminal; and
   pulsing the pilot plasma power supply on for sufficient time to strike a high voltage arc between the at least one electrode and a counter electrode;
wherein the negative terminal of the pilot power supply is in electrical contact with either the at least one electrode or the counter electrode such that if the negative terminal is in electrical contact with the at least one electrode, the positive terminal is in contact with the counter electrode and if the positive electrode is in contact with the at least one electrode, the negative terminal is in contact with the counter electrode.

8. The method of claim 6 wherein the step of sustaining the plasma comprises:
   contacting the at least one electrode with either a positive terminal of a constant current power supply or the negative terminal of a constant current power supply wherein if the negative terminal of the constant current power supply is in electrical contact with the at least one electrode, the positive terminal of the constant current power supply is in contact with the counter electrode and if the positive electrode of the constant current power supply is in contact with the at least one electrode, the negative terminal of the constant current power supply is in contact with the counter electrode; and
   applying a voltage between the at least one electrode and the counter electrode sufficient to maintain the plasma.

9. The method of claim 6 wherein the hydrogen gas is present in an amount of about 5% to about 6% of the total volume of the plasmagenic gas mixture.

10. The method of claim 6 wherein the hydrogen gas is present in an amount of about 6% of the total volume of the plasmagenic gas mixture.

11. The method of claim 6 wherein the argon gas is present in an amount of about 30% to about 40% of the total volume of the plasmagenic gas mixture.

12. The method of claim 6 wherein the argon gas is present in an amount of about 35% of the total volume of the plasmagenic gas mixture.

13. The method of claim 6 wherein the plasmagenic gas flows through a restricting orifice after the gas is introduced into the plasma torch apparatus.

14. The method of claim 6 further comprising the steps of:
   directing the plasma onto a metallic workpiece; and
   moving the plasma over the metallic workpiece,
wherein the metallic workpiece is the counter electrode and is cut by the plasma.

15. The method of 6 further comprising the steps of:
   directing the plasma onto a metallic workpiece; and
   moving the plasma over the metallic workpiece;
wherein the metallic workpiece is the counter electrode and metal is removed from the metallic workpiece by the plasma.

16. The method of claim 6 further comprising the steps of:
   introducing a wire feedstock into the plasma to form a spray of metal; and
   directing the spray of metal over a workpiece,
wherein the workpiece is coated with a metallic film.

17. The method of claim 6 wherein the at least one electrode is a cathode and the counter electrode is an anode.

18. The method of claim 6 wherein the plasma arc machining operation is a plasma transferred wire arc process.

19. The method of claim 6 wherein the plasma arc machining operation is a plasma cutting process.

20. The method of claim 6 wherein the plasma arc machining operation is a plasma gouging process.

* * * * *